UNITED STATES PATENT OFFICE.

THEODORE B. WAGNER, OF BROOKLYN, NEW YORK.

PROCESS OF TREATING THE RESIDUAL LIQUOR OBTAINED IN THE HYDROLYSIS OF CELLULOSIC MATERIALS AND PRODUCTS THEREOF.

1,261,328.     Specification of Letters Patent.     Patented Apr. 2, 1918.

No Drawing.     Application filed September 17, 1917. Serial No. 191,841.

*To all whom it may concern:*

Be it known that I, THEODORE B. WAGNER, a citizen of the United States, residing at 160 Columbia Heights, in the borough of Brooklyn, county of Kings, and State of New York, have invented certain new and useful Improvements in Processes of Treating the Residual Liquor Obtained in the Hydrolysis of Cellulosic Materials and Products Thereof, of which the following is a specification.

This invention relates to a product derived from the liquor obtained in the hydrolysis of wood waste, and to a process of making said product.

Among the new industries which have assumed importance in this country because of their tendency in the direction of conservation of natural resources, that of producing ethyl alcohol from wood waste and other cellulosic raw materials occupies a prominent position.

It has been proposed in the past to utilize the sugar-containing liquor, obtained after hydrolyzing the wood waste or other cellulosic raw material by means of an acid, as a fodder, by incorporating it after suitable treatment with feeding stuffs such as alfalfa, bran, etc. This, however, represents an economic loss, as the alcohol obtainable from the sugar liquor has a commercial value much in excess of its value as a food stuff. It has also been proposed to use the sugar-containing liquor in another form as a fodder, by incorporating it with the hydrolyzed wood waste and placing this mixture, after drying, on the market as a feed stuff for cattle.

My new process differs greatly from those above mentioned especially in that I proceed to obtain pure ethyl alcohol by fermenting the sugar-containing liquor in the usual way, after adding yeast, mashed grain or other suitable yeast food, and then treat the liquor remaining after the alcohol has been removed by distillation. This last mentioned residual liquor is to-day a waste, and is usually carried off through sewers or other conduits and has proven the source of considerable annoyance by polluting streams and creeks adjacent to the plant where such acid hydrolysis of wood waste and other cellulosic materials is carried on for the purpose of producing ethyl alcohol. I have discovered that this residual liquor may be converted into a commercial commodity of considerable value by neutralizing its acidity, fiiltering it and concentrating the filtrate to a viscous condition.

As an illustration of one mode of carrying out the process of producing the new composition, the following example is given:

Wood waste or other cellulosic raw material, after a preliminary treatment for the removal of turpentine and other volatile oils, is thoroughly hydrolyzed by being subjected to the action of a mineral acid, preferably sulfuric, which action is allowed to proceed at an elevated temperature for a suitable length of time—the amount of acid, the degree of heat and the length of time depending upon and varying with local conditions, the nature of the cellulosic materials employed, etc. The sugars formed by such hydrolyzing process are leached with water from the solid residue; the liquor thus obtained is collected and neutralized and delivered to the fermenting vats, where, after adding yeast and suitable yeast food, a normal alcoholic fermentation sets in if the necessary precautions are taken. When the fermentation is completed, or nearly so, the "beer" is passed through an appropriate distilling apparatus where the alcohol is distilled off in the customary manner.

The liquor remaining after such distillation has taken place forms my raw material. At that point it has a gravity usually corresponding to 3° to 5° Brix, (*i. e.*, from 97 to 95% of water) and has a more or less pronounced acidity. I reduce the latter to nearly the neutral point by the careful addition of a suitable agent, such as calcium carbonate, pass the liquor, if necessary, through a filter press or any other suitable apparatus, for the removal of the sludge resulting from the neutralizing, and of other suspended matter which may be present. I then introduce the purified liquor into an evaporating apparatus of the well known triple or quadruple effect type. The evaporation is conducted therein until the content of water has been reduced to about 30 to 35%, corresponding to 54 to 64 degrees Brix. In order to produce a heavy concentrate, it may be found advisable, in the later stages of evaporation, to conduct the latter in a single effect, a so-called "pan." The product thus obtained forms a heavy, almost black, viscous liquid, and has substantially the following composition:

| | |
|---|---|
| Water | 32.20% |
| Mineral matter | 7.34% |
| Protein | 1.02% |
| Reducing sugars (calculated as dextrose) | 36.55% |
| Other non-nitrogenous matter | 22.89% |

Although the composition may vary to a certain extent the per cent. of mineral matter is usually between 5 and 10, and that of reducing sugars between 30 and 40. The percentage necessarily varies with the amount of water left in the mixture, which is substantially less than 95% and preferably between 25 and 35%.

When discharged from the evaporators or dropped from the pan, my new product is in finished form and may be shipped either in barrels or tank cars.

The reducing sugars contained in my new product belong to the class of pentoses and being readily assimilated by the digestive organs of animals, my new product may be employed as an ingredient of feeding stuffs, stock foods and the like.

My new product is especially useful in the manufacture of dyewood and tanning extracts, in which it will supplant more costly materials; in a general way it may be used advantageously wherever the use of a liquid "filler" is desired. Because of its relatively large percentage of reducing sugars, it will find ready employment by the chemical industries.

It will be understood that my invention as regards the process is not limited to the above specific example, but that various changes in details may be made without departing from the scope of the invention, and that the new product may vary to a certain extent in the proportions of its constituents.

What I claim is:

1. The process of converting into a valuable product the waste liquor remaining after the distillation of the alcohol from the fermented sugar-containing liquor resulting from the hydrolysis of cellulosic material, which comprises substantially neutralizing said waste liquor and removing at least part of the water therefrom.

2. The process of converting into a valuable product the waste liquor remaining after the distillation of the alcohol from the fermented sugar-containing liquor resulting from the hydrolysis of cellulosic material, which comprises substantially neutralizing said waste liquor and removing at least part of the water and solids contained therein.

3. The process of converting into a valuable product the waste liquor remaining after the distillation of the alcohol from the fermented sugar-containing liquor resulting from the hydrolysis of cellulosic material, which comprises substantially neutralizing said waste liquor, filtering to remove any sludge, and concentrating the filtrate to a viscous condition.

4. The process of converting into a valuable product the waste liquor remaining after the distillation of the alcohol from the fermented sugar-containing liquor resulting from the hydrolysis of cellulosic material, which comprises reducing the water content of said waste liquor to about 25 to 35%.

5. The process of converting into a valuable product the waste liquor remaining after the distillation of the alcohol from the fermented sugar-containing liquor resulting from the hydrolysis of cellulosic material, which comprises substantially neutralizing said waste liquor, filtering the neutralized liquor to remove any resulting sludge, and reducing the water content of the filtrate to about 30 to 35%.

6. A new product containing less than about 35% of water and comprising a mixture obtainable from cellulosic material, said mixture containing from about 5 to 10% of mineral matter, from about 30 to 40% of reducing sugars, and from about 25 to 35% of water.

7. A new composition obtainable by a process which comprises evaporating at least part of the water from the residual liquor remaining after the distillation of the alcohol from the fermented sugar-containing liquor resulting from the thorough hydrolysis of cellulosic material, said composition containing pentoses, substantially less than 95% of water, and being substantially free from unconverted cellulose.

8. A new composition obtainable by neutralizing, filtering, and then evaporating part of the water from the waste liquor remaining after the distillation of the alcohol from the fermented sugar-containing liquor resulting from the hydrolysis of cellulosic material, said composition containing more than 30% of reducing sugars (calculated as dextrose) and between about 25 and 35% of water.

9. A new composition obtainable from cellulosic material and containing from about 30 to 35% of water, from about 5 to 10% of mineral matter, and from about 30 to 40% of reducing sugars, said composition being substantially neutral.

In testimony whereof, I have hereunto set my hand in the presence of two subscribing witnesses.

THEODORE B. WAGNER.

Witnesses:
WALBURGA M. BUCK,
EVA McGREW.